United States Patent [19]
Pina, Jr.

[11] Patent Number: 6,039,039
[45] Date of Patent: Mar. 21, 2000

[54] MODULAR OUTDOOR GRILL WITH A PIVOTAL FOOD SUPPORTING RACK

[76] Inventor: Amado Pina, Jr., 3728 S. Meadows, Alvin, Tex. 77511

[21] Appl. No.: 09/176,363

[22] Filed: Oct. 21, 1998

[51] Int. Cl.⁷ .............................. A47J 37/07; A23B 4/044
[52] U.S. Cl. ......................... 126/25 R; 126/338; 126/339
[58] Field of Search .................................. 126/9 R, 25 R, 126/41 R, 337 R, 338, 339, 340

[56] References Cited

U.S. PATENT DOCUMENTS

| | | |
|---|---|---|
| 957,748 | 5/1910 | Coppridge . |
| 2,161,669 | 6/1939 | Freeman . |
| 2,902,026 | 9/1959 | Hathorn, Jr. ........................... 126/25 R |
| 2,933,080 | 4/1960 | Adey . |
| 3,045,582 | 7/1962 | Wells .................................... 126/25 R |
| 3,096,706 | 7/1963 | Cardwell . |
| 3,151,609 | 10/1964 | Hastings, Jr. . |
| 3,459,171 | 8/1969 | Swanson .............................. 126/25 R |
| 3,568,590 | 3/1971 | Grice .................................... 126/25 R |
| 3,753,396 | 8/1973 | Koziol . |
| 4,083,354 | 4/1978 | Claire et al. . |
| 4,362,093 | 12/1982 | Griscom . |
| 4,665,891 | 5/1987 | Nemec et al. ........................ 126/25 R |
| 4,840,118 | 6/1989 | Rinehart . |
| 4,862,792 | 9/1989 | Lerma, Jr. .............................. 126/9 R |
| 5,031,602 | 7/1991 | Vick ..................................... 126/25 R |
| 5,065,734 | 11/1991 | Elliott . |
| 5,183,027 | 2/1993 | Saldana . |
| 5,195,423 | 3/1993 | Beller ................................... 126/25 R |
| 5,247,877 | 9/1993 | Beard et al. . |

*Primary Examiner*—Ira S. Lazarus
*Assistant Examiner*—Sara Clarke
*Attorney, Agent, or Firm*—Akin, Gump, Strauss, Hauer & Feld, L.L.P.

[57] ABSTRACT

A modular outdoor grill for cooking over a bed of combustible fuel or by means of convection heating from an externally mounted firebox. The modular grill comprises a housing with an outwardly, horizontally pivotal food-supporting tray, a vertically extending standard for supporting said housing, and either a horizontally reciprocating fuel-supporting grate or an externally mounted firebox.

14 Claims, 5 Drawing Sheets

MODULAR OUTDOOR GRILL WITH A PIVOTAL FOOD SUPPORTING RACK

BACKGROUND OF THE INVENTION

1. Field of the Invention

This invention relates to outdoor grills, smokers and cooking structures for cooking foods on a grill, grate, rack or foraminous surface located directly above a combustible fuel on a fuel-supporting grate. This invention also relates to outdoor grills, smokers and other cooking structures for cooking foods on a grill, grate, rack or foraminous surface heated indirectly by convection heating from an externally affixed firebox.

2. Description of the Prior Art

Outdoor smokers and barbecue grills generally include a housing which contains in a lower portion thereof, a grate, plate, pan or other supporting structure upon which the charcoal briquettes or other fuel is supported. A foraminous grill, grate or rack is used to support food to be cooked over the fuel. There is often provided a dome or hood which can be lifted up or pivoted to an open position to permit the cook to have access to the food. Usually, when the hood is opened the food remains in the same position over the fuel, with the result that the hot combustion gases from the fuel exit the housing upwardly striking the hands, arms and face of the cook and bystanders. The smoke formed from the food or the fuel also exits upwardly causing discomfort to the cook and bystanders. There is also a large heat loss every time the hood is opened which results in extended cooking times and increased consumption of fuel.

U.S. Pat. No. 4,840,118 to Rinehart depicts an outdoor grill mounted on a stationary standard. The grill has a hinged housing through which fuel must be added to the fuel-supporting grate and a horizontally reciprocating food-supporting tray, mounted on tracks inside the housing, which permits inspection of food without opening the hinged housing.

U.S. Pat. No. 2,161,669 to Raymond shows a portable broiler having a pull out ash drawer over which fuel is mounted, with the fuel-supporting grate disposed below a food-supporting grate or grill at the upper side of the broiler. The food-supporting grate is only vertically extractable and must be removed to permit addition of the combustible fuel onto a fuel-supporting grate located beneath food-supporting grate. The ash drawer moves on tracks constituted by angle iron strips, and carries a large, vertically extending, front wall or plate which closes an opening in the broiler at the time that the ash drawer is pushed into the main housing of the broiler.

A similar ash drawer is described in U.S. Pat. No. 2,933,080 to Adey. In the Adey patent, a housing is mounted on the upper side of a framework, having a single pair of wheels mounted thereon, and includes a food-supporting grill located over the ash drawer. A dome or hood is mounted over this food-supporting grill. The food-supporting grill appears not to be movable, except possibly upwardly.

U.S. Pat. No. 3,096,706 to Cardwell shows a charcoal-retaining grid which is removable from the inside of a housing. The grid is slidably retained on rails. This system also has a food pan which can be pulled outwardly upon supporting rails by means of an outwardly projecting handle.

U.S. Pat. No. 3,151,609 to Hastings includes a pair of trays which can be slid horizontally into and out of a charcoal cooker housing but which requires first opening a side panel to permit horizontal extraction of the trays from within the housing. The firebox which supports the charcoal does not appear to be removable from this housing. The firebox is positioned at an elevation within the charcoal cooker housing which is higher than the trays which are removable, thus indicating the movable trays are not cooking surfaces. A spit or grate is used for supporting the food so as to expose it to a source of heat located therebelow in the firebox within the charcoal cooker housing. This grate appears to be removable only by vertically lifting the tray, after a dome or hood has been pivoted upwardly about a hinge connecting it to the base portion of the housing.

U.S. Pat. No. 3,380,444 to Stalker illustrates a transportable cooking apparatus which includes a drawer used for containing charcoal briquettes. This drawer is horizontally outwardly extractable on rails or tracks to permit addition or removal of the charcoal. A food-supporting grill or grate can be placed in position over the charcoal drawer, but this grill cannot be slidably removed from the cooker housing. A hood or dome is hingedly connected to a base portion of the housing for pivotation about a horizontal axis.

U.S. Pat. No. 3,753,396 to Koziol depicts a pole mounted outdoor grill having a foraminous food-supporting surface affixed to the body of the grill by a ball and socket arrangement. The ball and socket arrangement permits the food-supporting surface to pivot upwardly and rotate 180° to interchange the orientation of the upper and lower surfaces of the food-supporting surface relative to the fuel-supporting surface in the lower portion of the grill housing.

U.S. Pat. No. 4,362,093 to Griscom depicts a grill which has a housing slidably attached to an upper surface of a standard having a single pair of wheels affixed thereto. A fuel-supporting tray is also slidably mounted to the upper surface of the standard and supports a vertically extractable foraminous food-supporting grate.

U.S. Pat. No. 5,065,734 to Elliott depicts a portable grill, designed for outdoor or indoor use, with a stationary standard and a grill housing having a removable hood. The vertically removable grill is supported in the housing by integral interior lips which maintain the grill above combustible fuel in bottom of the housing.

U.S. Pat. No. 5,247,877 to Beard depicts a barbecue grill in which operation of a handle causes the hinged lid of the grill to rise, the food-supporting surface to slidably exit the interior of the grill housing, and the hinged lid to close.

In general, the prior art described above is not thought to include, in an outdoor smoker and grill, a fixed-body housing having a horizontally reciprocating fuel-supporting surface in the lower portion of the housing and a foraminous-type, food-supporting assembly pivotably mounted permitting the food-supporting assembly to be horizontally pivoted outwardly from the housing without interruption of venting of hot combustion gases and smoke through the chimney to the atmosphere.

BRIEF SUMMARY OF THE INVENTION

The present invention provides an outdoor grill or smoker in which food can be cooked. The construction of the grill permits the cook to inspect the food being cooked without being subjected to exposure to hot combustion gases from the fuel or from smoke emanating from within the housing.

Broadly described, the outdoor cooking grill of the present invention includes a support frame or standard upon which a housing is removably mounted and supported. The housing, as thus supported at the upper side of the standard or support frame, includes a base portion, in which the food to be cooked and the fuel may be located. The fuel may be supported upon a tray within the housing, and the food is supported upon a horizontally pivotal assembly having a foraminous food-supporting surface. The food-supporting assembly can be pivoted horizontally out of the housing through an opening, formed in the wall of the housing, large enough to accommodate the food-supporting assembly. The food-supporting assembly includes a wall or plate at one side thereof which is sized to close the opening in the housing when the food-supporting rack is pivoted inwardly to a closed position. As the food-supporting assembly is moved to a position external to the housing, the food carried thereon is exposed to view and can be easily inspected, manipulated and treated by the cook. The hot combustion gases exiting through the chimney on the housing create a draft into the housing interior preventing smoke or heat from venting through this opening to interfere with the cook's inspection of the food or his cooking operations.

The present invention avoids having to open the grill housing in order to inspect the food. The present invention avoids having to withdraw the food-supporting surface from the interior of the housing prior to manipulation or addition of the fuel.

An advantage of the invention is to provide an outdoor cooking grill which permits the cook to inspect, treat or manipulate the food being cooked without interference from smoke or heat.

Another advantage of the invention is to provide an outdoor grill or cooking unit which includes a fuel-containing housing and a horizontally pivotal food-supporting assembly which can be pivoted through an opening in the front wall of the housing such that when the food-supporting assembly is pivoted outwardly to a position where the food is exposed to view and manipulation by the cook, the upward draft through the adjustable chimney prevents smoke and heat from passing through the opening in the front wall of the housing.

Another advantage of the invention is having a modular grill which is easily transported and assembled by an individual without assistance. A further advantage of the modular construction is rapid and simple conversion from a grill with a fuel located within the housing to a smoker with a fuel located within an externally mounted firebox.

Another advantage of the invention is providing a means to access the fuel-supporting surface without having to first move or extract the food-supporting surface.

Additional objects and advantages will become apparent as the following detailed description is read in conjunction with the accompanying drawings which illustrate a preferred embodiment of the invention.

BRIEF DESCRIPTION OF THE DRAWINGS

In order to more fully understand the drawings referred to in the detailed description of the present invention, a brief description of each drawing is presented, in which.

DETAILED DESCRIPTION OF INVENTION

Figure 1:
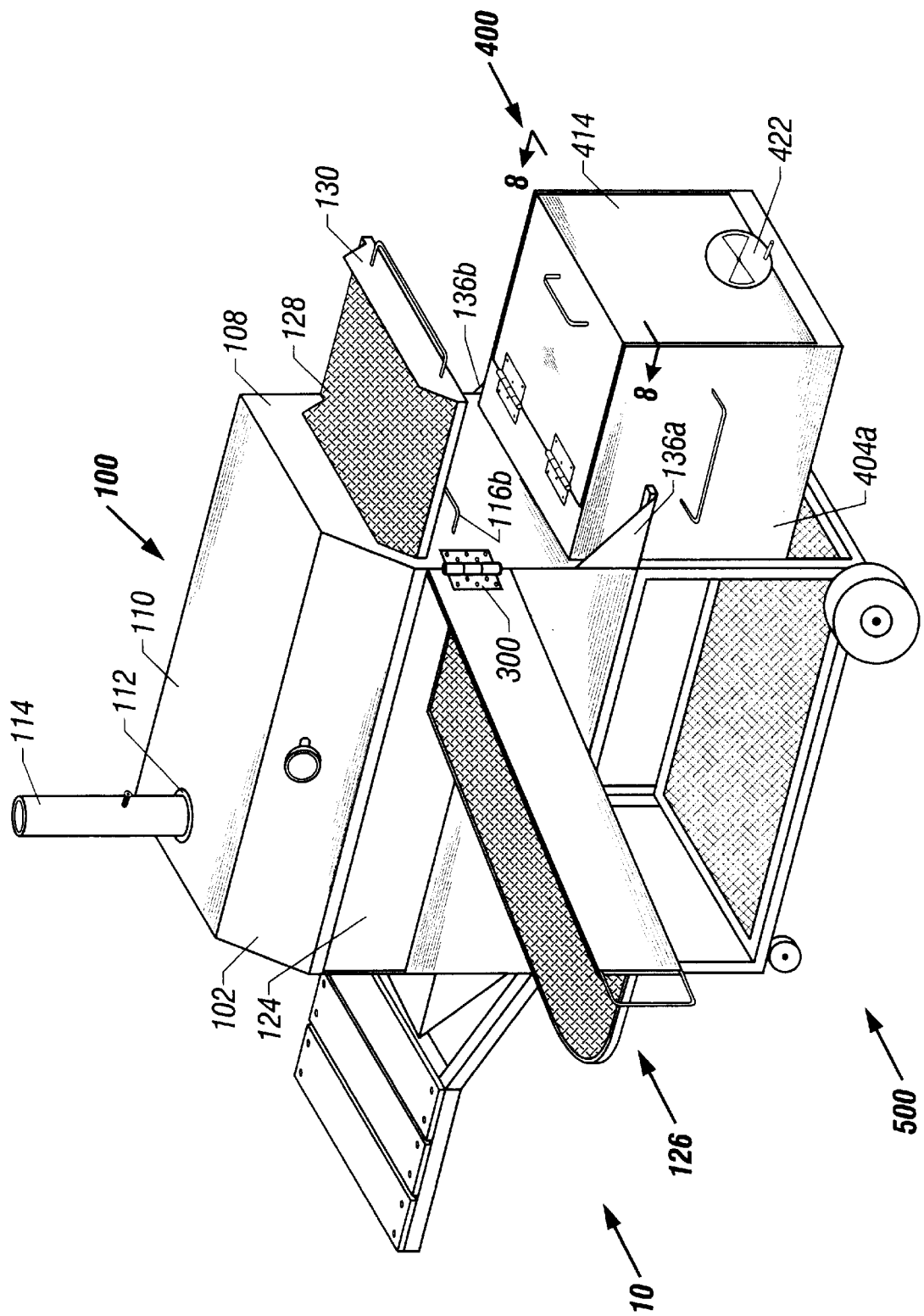
FIG. 1 is a perspective view illustrating an outdoor grill constructed in accordance with the present invention with the external firebox mounted onto the housing which is supported by the standard.

Referring to the drawings in greater detail, a modular outdoor grill is generally designated as reference number 10 in FIG. 1. The modular outdoor grill 10 is shown with a fixed-body housing 100 supported on a standard or support frame 500 and having a horizontally pivoting food-supporting tray 126 in a partially open position. An optional firebox 400, shown in the closed position, is attached to the housing 100.

Figure 9:
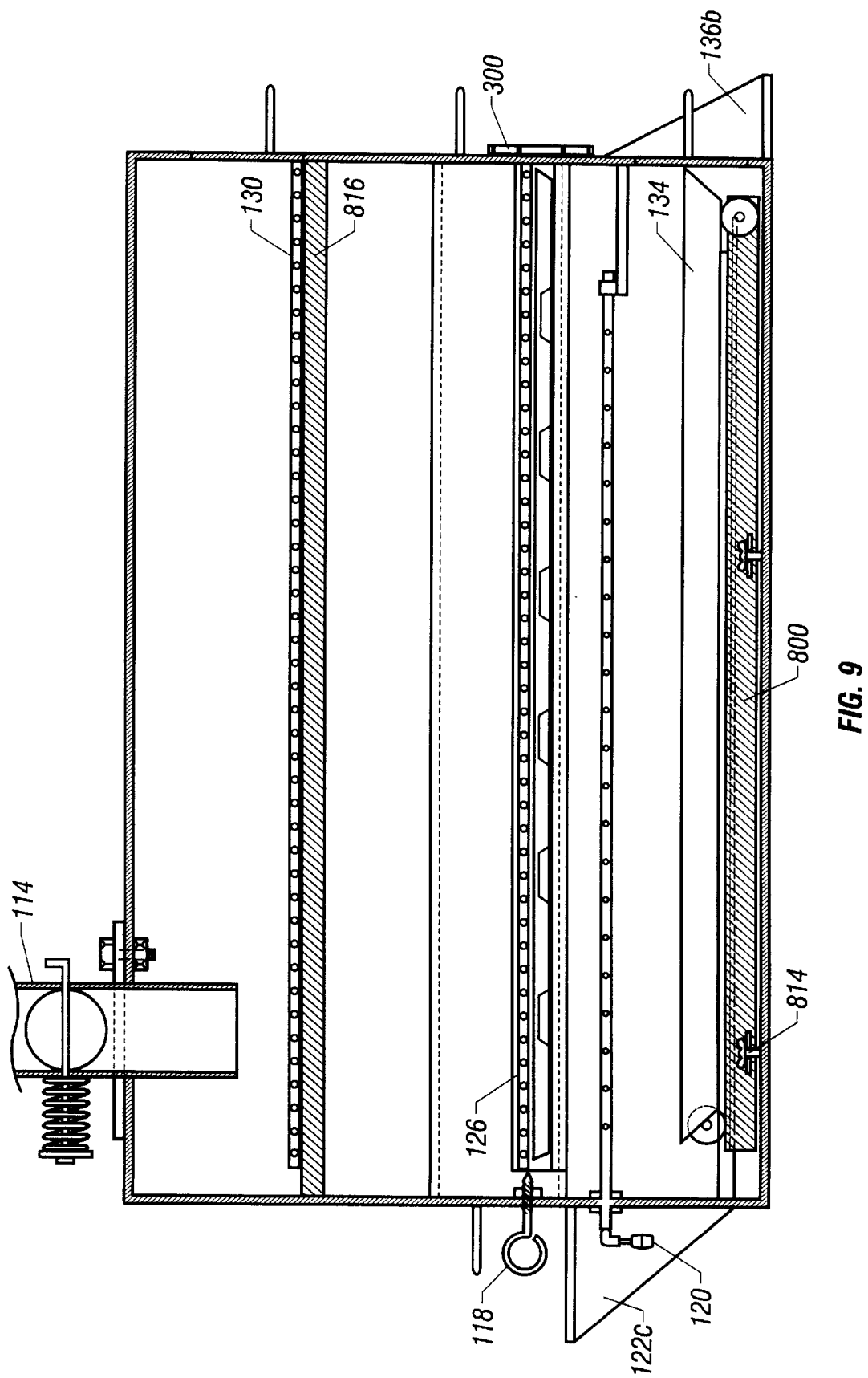
FIG. 9 is a sectional, front elevational view of the housing.

It can be seen by comparing FIGS. 1 and 9 that the firebox 400 may be replaced by a horizontally reciprocating fuel-supporting tray 134. FIG. 9 further shows the horizontally reciprocating food-supporting tray 130 in a fully inserted position in the housing 100. The details pertaining to these and other features will be explained in greater detail below.

Figure 5:
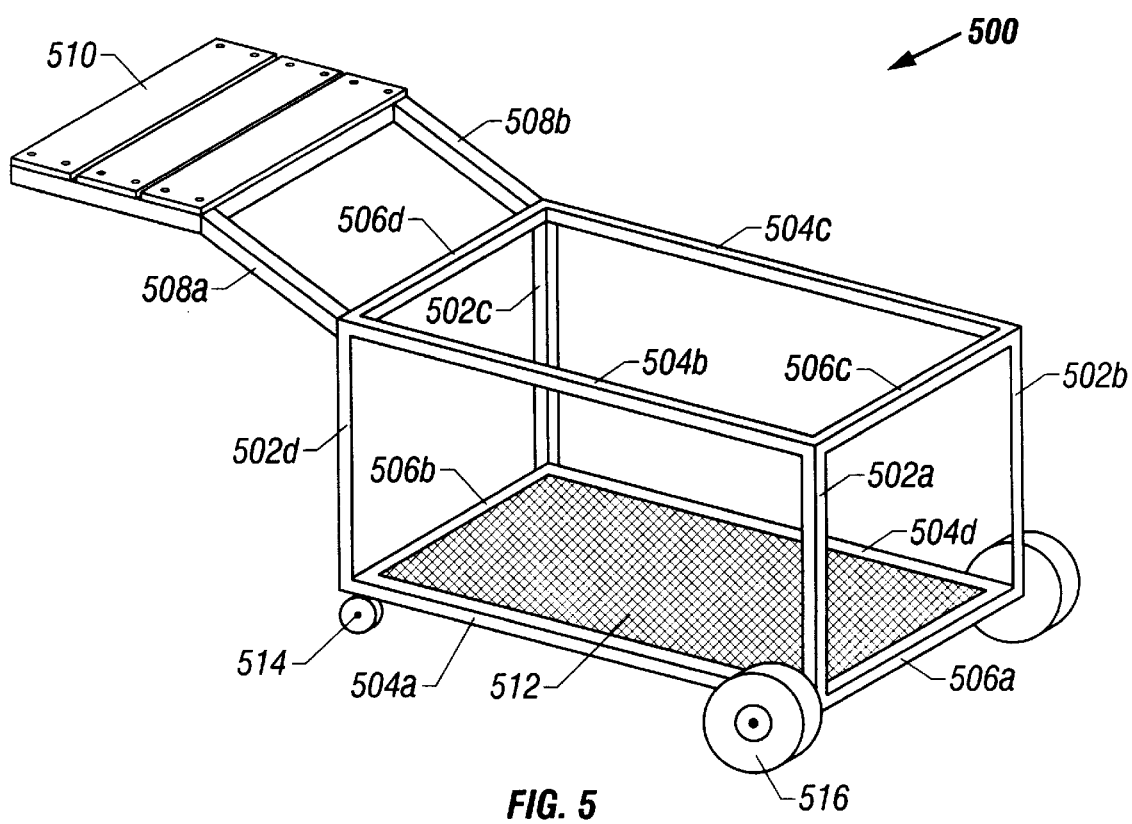
FIG. 5 is a perspective view of the standard without the housing mounted thereon.

An outdoor grill 10 according to the present invention as shown in FIG. 1, includes a support frame 500, as shown in FIG. 5, having a plurality of vertically extending legs 502a, 502b, 502c and 502d located at the four corners of the support frame 500.

The pairs of vertically extending legs 502a and 502d and 502b and 502c of the support frame 500 are interconnected by lower and upper pairs of horizontal longitudinal elements 504a and 504d and 504b and 504c, respectively, as illustrated in FIG. 5. The vertically extending legs 502a and 502b are also interconnected by a pair of lower and upper relatively short, parallel, transverse brace elements 506a and 506c respectively. The legs 502c and 502d are similarly interconnected by a pair of lower and upper transverse brace elements 506b and 506d as shown in FIG. 5.

Also, as shown in FIG. 5, the transverse brace element 506b has two roller mechanisms 514, which are preferably swivel casters, each located approximately at the intersections of the transverse brace element 506b and the extending legs 502c and 502d. The lower transverse brace element 506a has two wheels 516, preferably air tires, each located approximately at the intersections of the lower transverse brace element 506a and the two vertically extending legs 502a and 502b. At each of the two intersections of the upper transverse brace element 506d and the two vertically extending legs 502c and 502d is attached a handle element 508a and 508b, respectively. The handle elements 508a and 508b are attached at an angle such that the distal portion of the handle element, which has approximately a 45° bend, is parallel to, but above, the plane surface formed by the pair of upper taansverse brace elements 506c and 506d. The portions of the handle elements which are approximately parallel to the upper surface plane of the support frame may have affixed thereto one or more pieces of planar material 510, preferably wood, plastic or metal, so as to form a support surface between the two handle elements 508a and 508b as shown in FIG. 5.

The space defined by the two lower brace elements 504a and 504d and the lower pair of transverse brace elements 506a and 506b may have affixed therein a material, such as a grate or boarding, to form a support surface 512 as shown in FIG. 5.

The outdoor grill 10 further includes a housing 100, shown in FIG. 1 supported by the upper surface of the supporting frame 500 as illustrated in FIG. 1. The housing 100 includes a bottom wall (not shown) which rests upon the horizontal brace members 504b, 504c, 506c and 506d, and which is preferably sized to cover the brace members 504b, 504c, 506c and 506d. The housing 100 includes opposed, parallel, vertically extending front wall 102 and rear wall (not shown) and a pair of opposed, parallel, vertically extending left and right end walls 106 and 108. The vertically extending front wall 102 and rear wall (not shown), and the left and right end walls 106 and 108 are connected at their lower edges to the horizontally extending bottom wall (not shown).

The vertically extending front wall 102 and rear wall and the left and right end walls 106 and 108 are connected at their upper edges to the horizontally extending top wall 110. Near the left wall 106 the top wall 110 has a circular opening 112 in which is placed a removable chimney 114 as shown in FIGS. 1 and 9.

Figure 2:
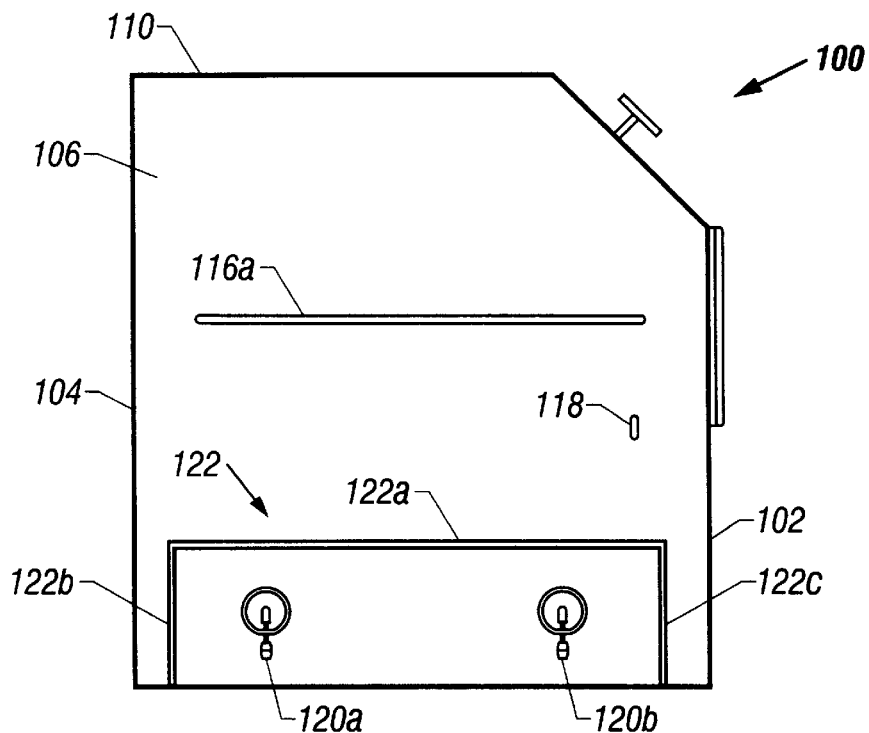
FIG. 2 is a side, elevational view of the housing.

As shown in FIG. 2, the left wall 106 has affixed thereto a handle 116a, an eyebolt 118, two valves 120a and 120b, and a flange 122. The two valves are located proximal to the horizontally extending bottom wall with one valve 120a proximally located near the vertically extending rear wall 104 and one valve 120b proximally located near the vertically extending front wall 102. The two valves permit the grill to be adapted to use a combustible gaseous fuel such as propane. The protective flange 122 is sized so as to fit between the two handle elements 508a and 508b of the standard. The flange 122 has a top surface 122a which extends outwardly from the left wall 106 a sufficient distance to protect valves 120a and 120b from being struck from above. The flange 122 also has a left side 122b and a right side 122c which are preferably angled from the top surface 122a of the flange to the left wall 106 of the housing 100 so as to form sides 120a and 120b with an angle of approximately 45° with respect to the left wall 106. For ease of carrying the housing, the handle 116a is attached parallel to the top surface 122a of the flange 122 and approximately centered between the front and rear walls 102 and 104, respectively. The eyebolt 118 is located near the front vertical extending wall 102 and parallel with the handle 116a.

As shown in FIG. 1, the front wall 102 has an opening 124 through which the pivoting food-supporting assembly 126 may be moved. In one embodiment of the present invention a portion of the front wall 102 above the opening 124 may be constructed at an acute angle, relative to the wall 102, to provide an inclined surface. This inclined portion of the front wall 102 may have mounted therein a temperature indication device.

Figure 8:
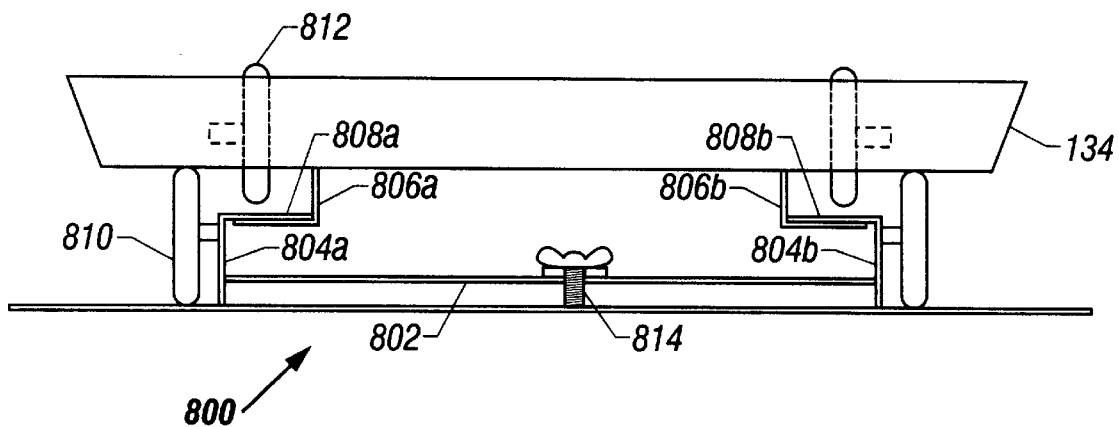
FIG. 8 is a sectional view taken along lines 8—8 in FIG. 1 view of the fuel-supporting tray, roller guides, rollers and optional wingnut assembly.

As shown in FIG. 1, the right wall 108 has a handle 116b coplanar with the corresponding handle 116a on the left end wall 106. The right end wall 108 has an opening 128 above the handle 116b, through which a second food-supporting surface 130 may be horizontally reciprocated. The right wall 108 has a second opening, near the bottom wall, through which a fuel-supporting surface 134 may be horizontally reciprocated. The right wall 108 also has two right angle flanges 136a and 136b (not shown) affixed thereto. The flange 136a is flush with the front wall 102 and the bottom wall and the flange 136b is flush with the rear wall 104 and the bottom wall. The two flanges 136a and 136b may support an optional firebox 400 (FIGS. 3 and 4) which may be affixed to the housing 100 in place of the horizontally reciprocating fuel-supporting grate 134 as shown in FIGS. 8 and 9.

Figure 6:
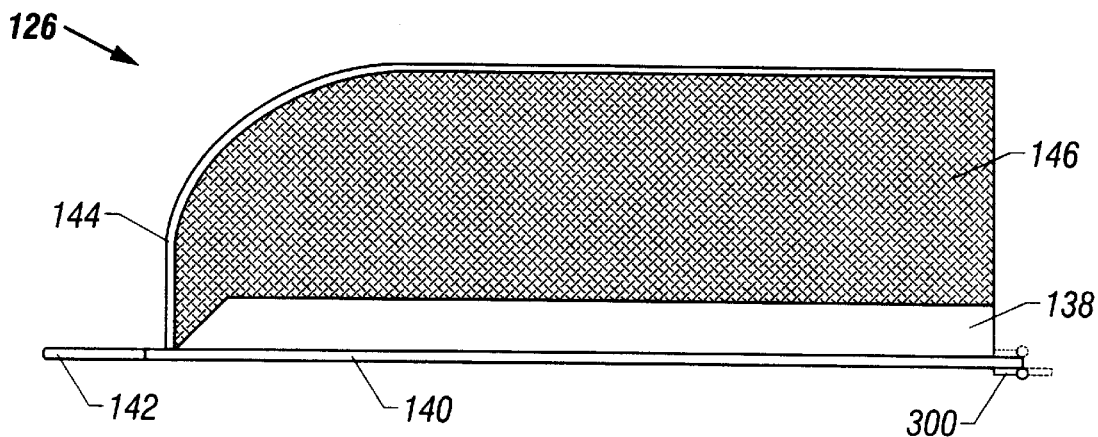
FIG. 6 is a plan view of the pivotal food supporting assembly.
Figure 7:
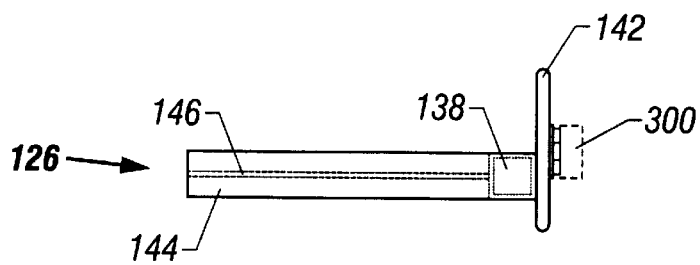
FIG. 7 is a side elevational view of the pivotal food supporting assembly viewed along lines 7—7 of FIG. 6.

As shown in FIGS. 1 and 9, a horizontally pivotal hinge 300 is affixed to the exterior of the housing on the right wall 108 and is approximately vertically centered within the opening 124 in the front wall 102. Optionally, the hinge 300 may be affixed to the interior of the housing on the right wall 108. Optionally, the food-supporting assembly could be pivotally secured to the front wall 102. A food-supporting assembly 126 is attached to the hinge mechanism 300 as shown in FIGS. 6 and 7. The pivotal food-supporting assembly 126 is formed by affixing a rigid bar 138 to the pivotal hinge 300 wherein the rigid bar 138 is substantially the same length as the opening 124 in the front wall 102. The rigid bar 138 has affixed thereto a front plate 140 which is of sufficient dimension to completely close the opening 124 in the front wall 102 when the food-supporting assembly 126 is in the closed position as shown in FIG. 1. The front plate 140 has a handle 142 attached to the front plate 140 at a point remote from the hinge mechanism 300. The handle 142 is preferably vertically attached as shown in FIGS. 1 and 6. The handle 142 may optionally be covered by a heat insulating material such as wood or plastic. As shown in FIGS. 1, 6 and 7, attached to the front plate 140 and the rigid bar 138 rod proximal to the vertical handle 142 is a second rigid metal support 144 which extends initially approximately perpendicular to the face plate 140 but which curves generally toward the pivotal hinge 300 until it becomes approximately parallel with the face plate 140. The extent of the curvature of the rigid metal support 144 is sufficient to allow the food-supporting assembly 126 to be pivoted into or out of the interior of the grill housing 100. A foraminous food-supporting surface 146 is attached to the first and second rigid supports, 138 and 144, respectively as shown in FIGS. 1 and 6. The foraminous food-supporting surface 146 is a heat resistant material and is preferably a plurality of metal rods or strips or a metal grate.

The horizontal movement of the food-supporting assembly 126 may be restricted during use of the grill or during transportation of the grill. As seen in FIG. 9, eyebolt 118 may be screwed into the left wall 106 until the eyebolt 118 contacts the rigid metal support 144. The pressure exerted by the eyebolt 118 prevents unintended horizontal movement of the pivotal food-supporting surface 126.

Figure 3:
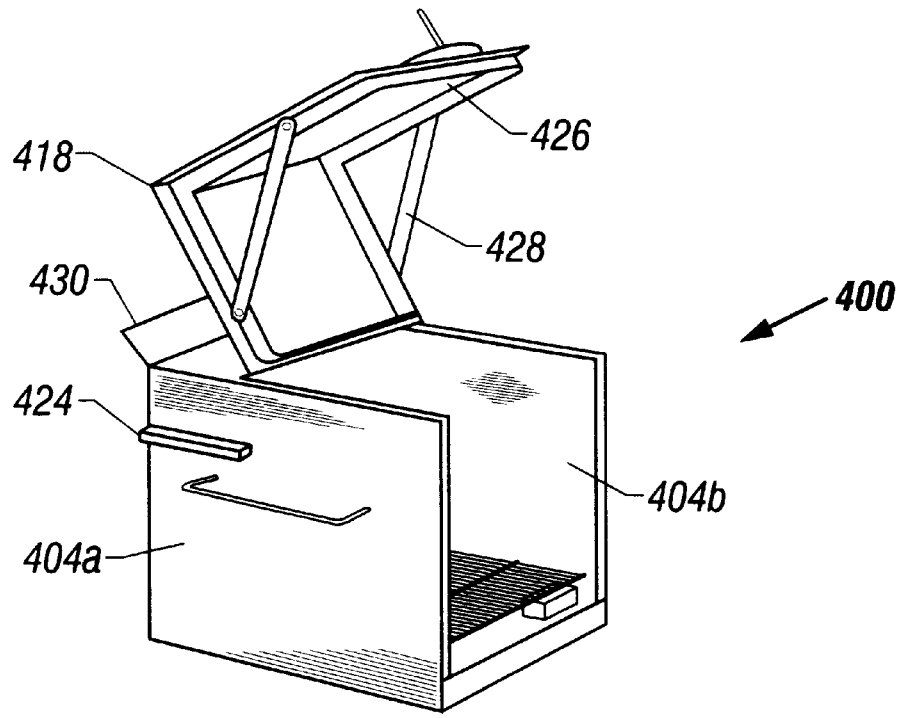
FIG. 3 is a perspective view of the external firebox shown in a open position.
Figure 4:
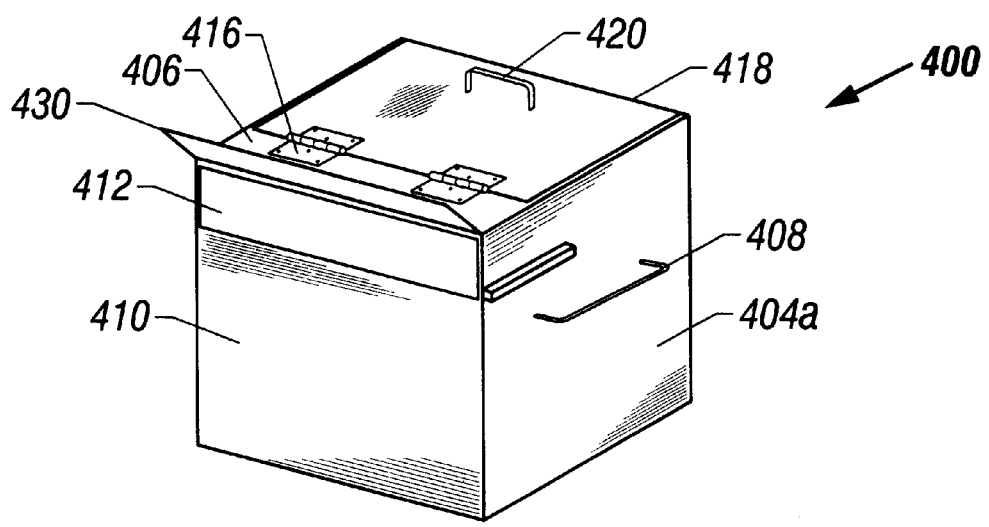
FIG. 4 is a perspective view of the back and side of the external firebox.

An optional adaptable firebox 400, shown in FIGS. 1, 3 and 4, may be used instead of the horizontally reciprocating fuel-support tray 134. The firebox 400 permits flavoring the food by the process of smoking as the food is cooked by convection heating. The optional firebox 400 is preferably generally box-like in shape. Attached to the bottom wall (not shown) of the firebox 400 are a left vertically extending side wall 404a and a right vertically extending side wall (not shown) respectively, which attach also to a horizontally extending top wall 406. The left and right side wall each has a handle for use in transporting the firebox 400. The handles may have single or multiple contact points with the firebox 400. Preferably the handles 408a and 408b have two contact points with the firebox 400. The handles 408a and 408b preferably have a horizontal orientation relative to the top wall 406. Optionally the handles 408a and 408b may be covered in a heat insulative material such as wood or plastic.

A vertically extending rear wall 410, also affixed to the bottom wall (not shown), terminates at a point below the top wall 406 so as to form an opening 412, in the rear wall 410 of the firebox 400 that approximates the same size opening as the opening 132 in the right wall 108 of the housing 100 through which the reciprocating fuel-supporting tray 134 is inserted.

The left and right side walls 404 and 404b of the firebox 400 each has a rigid support device 424 shown in FIGS. 3 and 4, affixed which is parallel to the bottom wall of the firebox 400 and located at a point approximately level with the upper end of the rear wall 410. When the firebox 400 is mounted on the housing 100 of the grill 10 the rigid support devices 424 are supported by the front and rear flanges 136a and 136b, respectively.

The top wall 406 extends horizontally between the left and right side walls 404 of the firebox 400. The top wall 406 also extends upwardly beyond the plane of the rear wall 410. The portion of the top wall 406 extending upwardly beyond the plane of the rear wall 410 is angled to form a lip 430 that can be inserted into the interior of the housing 100 through the second opening 132 on the right end wall 108. The lip 430 is angled upwardly relative to the top wall 406 of the firebox 400 so as to prevent unintentional movement of the firebox 400 away from the opening 132 with loss of heat to the grill housing 100. Preferably the lip 430 is angled approximately at a 45° angle relative to the top wall 406. The front wall 414 extends between the right and left side walls 404a and 404b. The height of the front wall 414 is chosen so as to prevent ash or fuel from falling out of the firebox 400 when the firebox cover 418 is open while also permitting unencumbered access to the interior of the firebox for the purposes of adding fuel or removing ashes. The front wall 414 is preferably approximately 10% of the height of the side walls 404a and 404b. The top firebox wall 406 has at least one and preferably two hinges 416 affixed to the top wall 406 and to a movable firebox cover 418. The movable firebox cover 418, by means of the hinges 416, may be opened upwardly to allow the introduction of fuel. The movable firebox cover 418 is preferably constructed with a right-angle bend, as shown in FIG. 3, such that in the closed position the hinged firebox cover 418 completes the generally box-like structure of the firebox 400 giving an enclosed structure having an opening 412 in the rear wall 410 as shown in FIG. 4. Viewed in the closed position (FIG. 4), the firebox cover 418 has on the horizontal upper surface a handle 420 affixed parallel to the front wall 414 of the firebox. The firebox cover 418 has, in that portion of the surface which acts has a front wall when the firebox cover is in a closed position, a rotatably movable vent 422 (FIG. 1) which allows one to control the flow of air through the firebox 400 and the interior of the housing 100.

As seen in FIG. 3, the interior surface of the firebox cover 418 has a series of rigid supports 426 affixed therein so as to be parallel to the perimeter of the firebox cover but not contacting the left and right side walls 404a and 404b. The rigid supports may optionally be reinforced with cross-braces 428.

FIG. 8 shows an end elevational view of the fuel-supporting tray 134 and the roller mechanisms associated therewith. The view in FIG. 8 is shown along the line 8—8 in FIG. 1. FIG. 9 shows a side view of the fuel-supporting tray 134 and associated track assembly 800. The track assembly 800 is formed from a base plate 802 having a right and left side. Attached to the left and right sides of the base plate are rigid support braces 804a and 804b (as shown in FIG. 8) each having a right-angled bend and affixed such that the horizontal surface of the rigid support brace extends over the surface of the base plate 802. Angle iron is a preferred material of construction for the rigid support material. A second set of rigid support braces 806a and 806b having right-angled bends are affixed to the horizontal surface of the first rigid support braces 804a and 804b such that the vertically extending portions of the second rigid support braces 806a and 806b extend upwardly away from the base plate 802. The first rigid support braces form a track mount to which rollers 810 are welded. A plurality of rollers may be welded on the track mount in sufficient numbers to provide substantially continuous support as the fuel-supporting tray 134 is horizontally reciprocated. The fuel-supporting tray 134 may have optional rollers 812 welded to the front side of the fuel-supporting tray 134 and protruding through openings in the front side of the fuel-supporting tray 134, as shown in FIGS. 8 and 9. The rollers 812 travel longitudinally the length of the upper surface of the rigid support braces 804a and 804b as the fuel-supporting tray 134 is reciprocated. The entire fuel-supporting assembly is dimensioned such that it may be inserted into the grill housing 100 through the opening 128. The base plate 802 of the track assembly 800 may optionally have one or more holes approximately centered therein which will coincide with optional holes in the bottom wall of the grill housing 100 to allow insertion of a wing nut assembly 814, as shown in FIGS. 8 and, 9 to removably mount the roller track assembly 800 to the bottom of the housing 100.

The horizontally reciprocating fuel-supporting tray 134 and the horizontally reciprocating food-supporting tray 130 are movably reciprocally on roller and track mechanisms which are well known to one of ordinary skill in the art as or slidably reciprocating on tracks 816, as shown in FIG. 9, as in U.S. Pat. Nos. 3,161,669, 3,096,706, 2,933,080, 3,151, 609, 3,380,444, 957,748 and 4,840,118 which are incorporated herein by reference.

The foregoing disclosure and description of the invention are illustrative and explanatory thereof, and various changes in the details of the illustrated apparatus and construction and method of operation may be made without departing from the spirit of the invention.

I claim:

1. A modular combination grill and smoker apparatus comprising:

a standard having a plurality of roller means; and a housing supported by said standard comprising:

a front wall having an opening;

a food-supporting assembly pivotally received in said opening in said front wall;

an end wall of said housing having an upper opening;

a second food-supporting assembly reciprocally received in said upper opening in said end wall;

said end wall of said housing having a lower opening; and a fuel support received in said lower opening in said end wall wherein the fuel support is selected from the group consisting of an internally disposed horizontally reciprocating fuel-supporting tray and an externally removably mounted firebox.

2. The apparatus of claim 1, wherein said food-supporting assembly is pivotally secured to said end wall.

3. A modular combination grill and smoker apparatus comprising:

a standard; and a housing supported by said standard comprising:

a first wall having an opening;

a food-supporting assembly pivotally received in said opening in said first wall;

one of said walls of said housing having a lower opening; and an interchangeable fuel support received in said lower opening, wherein the fuel support in the grill configuration is an internal tray and a fuel support in a smoker configuration is an externally mounted firebox.

4. The apparatus of claim 3, wherein the internal tray is removable and reciprocating.

5. The apparatus of claim 3, wherein the externally mounted firebox is removable.

6. The apparatus of claim 3, wherein said food-supporting assembly is pivotally secured to said end wall.

7. The apparatus of claim 3, wherein the standard further comprises a plurality of roller means.

8. The apparatus of claim 3, further comprising a second food-supporting assembly and an upper opening in one of said walls, wherein the second food-supporting assembly is received in said upper opening.

9. A modular apparatus capable of conversion between a grill configuration and a smoker configuration comprising:
   a standard; and
   a housing supported by said standard comprising:
   the housing having a plurality of vertical walls and having a plurality of openings;
   a food-supporting assembly pivotally received in one of said openings in one of said walls;
   one of said walls of said housing having a lower opening; and
   a fuel support received in said lower opening,
   wherein the fuel support in the grill configuration is an internal tray and a fuel support in a smoker configuration is an externally mounted firebox.

10. The apparatus of claim 9, wherein the internal tray is removable and reciprocating.

11. The apparatus of claim 9, wherein the externally mounted firebox is removable.

12. The apparatus of claim 9, wherein said food-supporting assembly is pivotally secured to said end wall.

13. The apparatus of claim 9, further comprising a second food-supporting assembly and an upper opening in one of said walls, wherein the second food-supporting assembly is received in said upper opening.

14. The apparatus of claim 9, wherein the standard further comprises a plurality of roller means.

\* \* \* \* \*